United States Patent
Yeh

(10) Patent No.: US 10,191,236 B2
(45) Date of Patent: Jan. 29, 2019

(54) HIGH-SPEED MULTI-CHANNEL OPTICAL TRANSMITTER MODULE AND METHOD FOR FABRICATING THE SAME

(71) Applicant: TrueLight Corporation, Hsinchu (TW)

(72) Inventor: Tzu-Ching Yeh, Hsinchu (TW)

(73) Assignee: TrueLight Corporation, Taiwan (TW)

( * ) Notice: Subject to any disclaimer, the term of this patent is extended or adjusted under 35 U.S.C. 154(b) by 0 days.

(21) Appl. No.: 15/624,454

(22) Filed: Jun. 15, 2017

(65) Prior Publication Data

US 2018/0224616 A1 Aug. 9, 2018

(30) Foreign Application Priority Data

Feb. 3, 2017 (TW) .................................. 106103683

(51) Int. Cl.
*G02B 6/42* (2006.01)
*G02B 6/30* (2006.01)
*G02B 6/38* (2006.01)

(52) U.S. Cl.
CPC ............. *G02B 6/4295* (2013.01); *G02B 6/30* (2013.01); *G02B 6/3881* (2013.01); *G02B 6/3885* (2013.01); *G02B 6/4206* (2013.01); *G02B 6/4281* (2013.01)

(58) Field of Classification Search
None
See application file for complete search history.

(56) References Cited

U.S. PATENT DOCUMENTS

| 7,050,678 B1* | 5/2006 | Isono ..................... G02B 6/423 385/15 |
| 2015/0255635 A1* | 9/2015 | Hsiao .................. H01L 31/0203 257/432 |

* cited by examiner

Primary Examiner — Chad H Smith

(57) ABSTRACT

A high-speed multi-channel optical transmitter module includes a plurality of laser-diode (LD) components, a plurality of photo-diode (PD) components, an MT ferrule, and a waveguide component. These components are firstly packaged as sub-modules individually, and then these sub-modules are packaged to form the high-speed multi-channel optical transmitter module. Therefore, the amount of individual components contained in the module is decreased, the complexity of structure is simplified, the precision of positioning is increased, such that the time and labors required in the assembling and packaging processes can be decreased, and the defect-free rate of products can be increased.

10 Claims, 9 Drawing Sheets

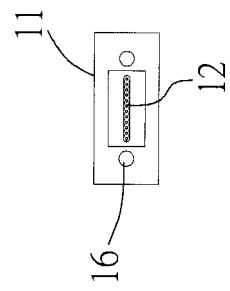
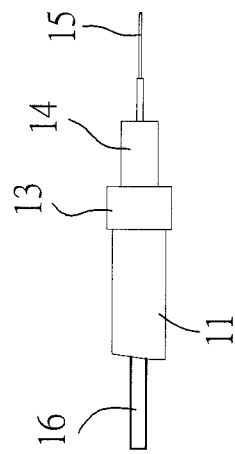
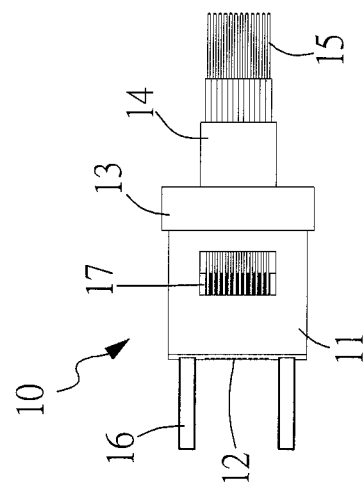
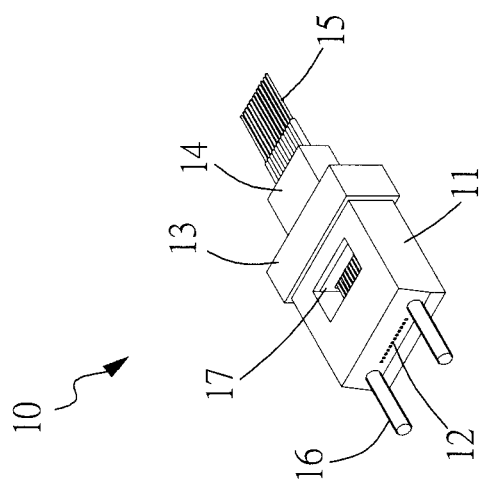

HIGH-SPEED MULTI-CHANNEL OPTICAL TRANSMITTER MODULE AND METHOD FOR FABRICATING THE SAME

This application claims the benefit of Taiwan Patent Application Serial No. 106103683, filed Feb. 3, 2017, the subject matter of which is incorporated herein by reference.

BACKGROUND OF INVENTION

1. Field of the Invention

The invention relates to a high-speed multi-channel optical transmitter module and a method for fabricating the same, and more particularly to the structure and packaging method of the high-speed multi-channel optical transmitter module that firstly packs separately a plurality of laser-diode components, a plurality of photo-diode components, and a waveguide component into individual sub-modules, and then integrates these sub-modules into a unique assembly.

2. Description of the Prior Art

It is proved that the optical communication technology can overcome conventional bandwidth problems successfully. Thus, this technology is excellent to be adopted to high-speed and/or long-distance transmission without being affected significantly by electromagnetic interference. Hence, the optical communication technology becomes the mainstream art for mass data transmission. In this disclosure, the so-called optical communication technology is a technology that implements lightwaves as signal carriers to be transmitted between two nodes of an optical fiber and introduces optical transceivers to transmit/receive lightwave signals.

Conventionally, according to applications, the optical transceivers can be classified into single-channel optical transceivers and multi-channel optical transceivers. In a multi-channel optical transceiver, a plurality of laser-diode (LD) packaging components for light-emitting and a plurality of photo-diode (PD) packaging components for receiving and detecting lightwaves are included in a single optical transceiver module. Further, a plurality of lightwave signals transmitted through the optical fiber for multiplexing can be used to enhance efficiency of signal transmission.

However, structurally, in the conventional multi-channel optical transceiver, each of the LD packaging components and the PD packaging components is individually assembled onto a housing frame and individually connected to a MT ferrule at a front end of the multi-channel optical transceiver via corresponding optical fibers. In such a multi-channel optical transceiver assembly, too many interior components are included, structuring of the assembly is complicated, precisely internal positioning of the components is difficult, and assembling and packaging processes of the assembly are laborious. In addition, connection arrangement of individual LD and PD packaging components to a common adapter ring via corresponding optical fibers would lead to a low yield caused by inevitable production loss. All aforesaid disadvantages in the conventional multi-channel optical transceiver tell that the current conventional design thereof does need further improvements.

SUMMARY OF THE INVENTION

Accordingly, it is the primary object of the present invention to provide a high-speed multi-channel optical transmitter module and a packaging method for the high-speed multi-channel optical transmitter module; in which a plurality of laser-diode components, a plurality of photo-diode component and a waveguide component are firstly packaged individually into corresponding sub-modules, and then these sub-modules are assembled to the high-speed multi-channel optical transmitter module as a unique piece, so as to reduce the unit number inside the module, to reduce the structural complexity, and to ensure the positioning precision. Thereupon, the assembling and packaging processes can be simplified, and the detect-free rate of products can be substantially increased.

In the present invention, the high-speed multi-channel optical transmitter sub-module includes:

a casing, having thereinside an accommodation space;

an MT ferrule, located in the accommodation space, having thereof a front end surface exposed out of the casing and a rear end surface having an optical fiber array including a plurality of bare optical fibers;

a waveguide sub-module, located in the accommodation space by closing to the MT ferrule, further including a front portion, a plurality of waveguide structures and a rear portion, the front portion having a recessed portion, the rear portion having a photo-transceiving component accommodation area, and the plurality of waveguide structures located inside the waveguide sub-module and extending between the recessed portion and the photo-transceiving component accommodation area, the recessed portion having a plurality of V-shape grooves extending in a front-rear direction, each of the bare optical fibers being positioned by one said corresponding V-shape groove, such that an end of said each of the bare optical fibers is to contact a contact surface on the recessed portion of the waveguide sub-module and to optically couple one sal'd corresponding waveguide structure;

at least one LD sub-module, located in the photo-transceiving component accommodation area, optically coupled with at least one said corresponding waveguide structure;

at least one PD sub-module. located in the photo-transceiving component accommodation area, optically coupled with at least one said corresponding waveguide structure; and a circuit board, located in the accommodation space by closing to the rear portion of the waveguide sub-module, electrically coupled with the at least one LD sub-module and the at least one PD sub-module, further having a tail portion thereof exposed out of the casing.

In one embodiment of the present invention, the casing includes a housing frame and a cover plate, the accommodation space being formed between the housing frame and the cover plate, the housing frame having thereon a front accommodation area for accommodating the MT ferrule, a middle accommodation area for accommodating the waveguide sub-module, at least one protrusive step structure located between the front accommodation area and the middle accommodation area, and a rear accommodation area for accommodating the circuit hoard, a plurality of nodes and a plurality of notch grooves being included for buckling the cover plate and the housing frame.

In one embodiment of the present invention, the high-speed multi-channel optical transmitter module further includes a constraint plate located above the recessed portion of the waveguide sub-module, the circuit board being a flexible circuit board.

In one embodiment of the present invention, the high-speed multi-channel optical transmitter module includes a plurality of said LD sub-modules, each of said LD sub-modules including an LD base block, a V-shape carrier recess located at a front portion of the base block, a lens located on the V-shape carrier recess, an LD component located on the LD base block at a position corresponding to an optical axis of the lens, a monitor photo-diode located at a rear portion of the LD base block, and a plurality of electrodes electrically coupling the LD component and extending to the rear portion of the LD base block; wherein the optical axis of the lens is corresponding to at least one said waveguide structure of the waveguide sub-module.

In one embodiment of the present invention, the high-speed multi-channel optical transmitter module includes only one said PD sub-module, the PD sub-module including a PD base block, a plurality of PD components located on a front end surface of the PD base block, each said PD component being corresponding to at least one said waveguide structure of the waveguide sub-module; wherein a plurality of metal strips are located on the PD base block at positions corresponding to the respective PD components, and the plurality of metal strips are extended on the front end surface and an upper surface of the PD base block.

In another aspect of the present invention, the method for fabricating a high-speed multi-channel optical transmitter module includes:

Step (A): providing at least one LD sub-module, at least one PD sub-module, a waveguide sub-module, an MT ferrule, a constraint plate, a cover plate, a housing frame and a circuit board; each said LD sub-module being formed by mounting a lens, an LD component and a monitor photo-diode on an LD base block; the PD sub-module being formed by mounting at least one PD component on a PD base block; the MT ferrule having a rear end surface further including an optical fiber array providing at least one LD sub-module, at least one PD sub-module, a waveguide sub-module, an MT ferrule, a constraint plate, a cover plate, a housing frame and a circuit board; each said LD sub-module being formed by mounting a lens, an LD component and a monitor photo-diode on an LD base block; the PD sub-module being formed by mounting at least one PD component on a PD base block; the MT ferrule having a rear end surface further including an optical fiber array formed by a plurality of bare optical fibers; the waveguide sub-module further including a front portion, a plurality of waveguide structures and a rear portion, the front portion having a recessed portion, the rear portion having a photo-transceiving component accommodation area, and the plurality of waveguide structures located inside the waveguide sub-module and extending between the recessed portion and the photo-transceiving component accommodation area, the recessed portion having a plurality of V-shape grooves extending in a front-rear direction; and Step (B): mounting the at least one LD sub-module and the at least one PD sub-module into the photo-transceiving component accommodation area of the waveguide sub-module, mounting each of the bare optical fibers of the MT ferrule into the recessed portion of the waveguide sub-module, and also having each of the bare optical fibers to be positioned into the corresponding V-shape grooves, such that each end of the bare optical fiber would contact a contact surface on the recessed portion of the waveguide sub-module so as to optically couple one respective waveguide structure; further, the constraint plate being applied to suppress adhesively the plurality of bare optical fibers in the recessed portion; then, assembling the waveguide sub-module onto the housing frame, and wire-bonding the circuit board to the plurality of LD components and the plurality of PD components so as to establish electric connections in between; finally, moving the cover plate to seal the housing frame, such that the packaging of the high-speed multi-channel optical transmitter module is completed.

All these objects are achieved by the high-speed multi-channel optical transmitter module and the method for fabricating the same described below.

BRIEF DESCRIPTION OF THE DRAWINGS

The present invention will now be specified with reference to its preferred embodiment illustrated in the drawings, in which:

FIG. 3A is a schematic perspective view of the MT ferrule of FIG. 1;

FIG. 3B is a top view of FIG. 3A;

FIG. 3C is a lateral side view of FIG. 3A;

FIG. 3D is a front view of FIG. 3A;

DESCRIPTION OF THE PREFERRED EMBODIMENT

The invention disclosed herein is directed to a high-speed multi-channel optical transmitter module and a method for fabricating the same. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

In the present invention, the high-speed multi-channel optical transmitter module and the method for fabricating the same high-speed multi-channel optical transmitter module are mainly to package firstly a plurality of laser-diode components, a plurality of photo-diode component and a waveguide component individually into corresponding sub-modules, and then to integrate these sub-modules to form the high-speed multi-channel optical transmitter module as a unique piece, so that the unit number inside the module can be reduced, the structural complexity can be lowered, and the positioning precision can be ensured. Thereupon, the assembling and packaging processes can be simplified, and the detect-free rate of products can be substantially increased.

Figure 1:
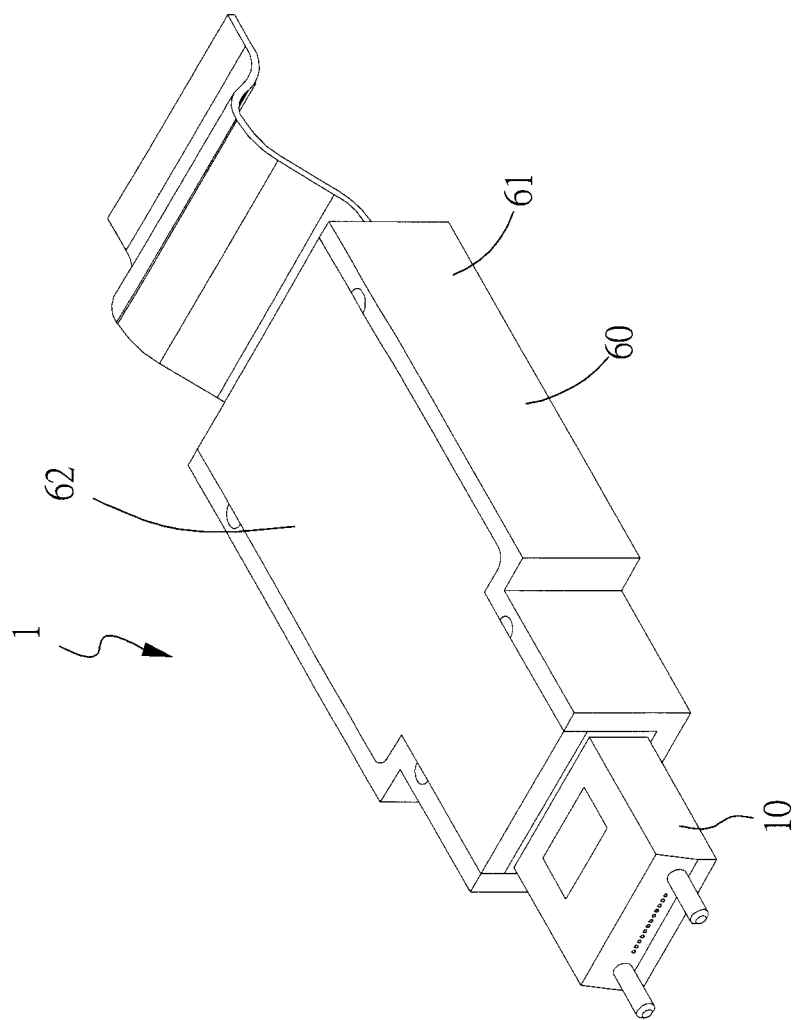
FIG. 1 is a schematic perspective view of a preferred embodiment of the high-speed multi-channel optical transmitter module in accordance with the present invention.
Figure 2A:
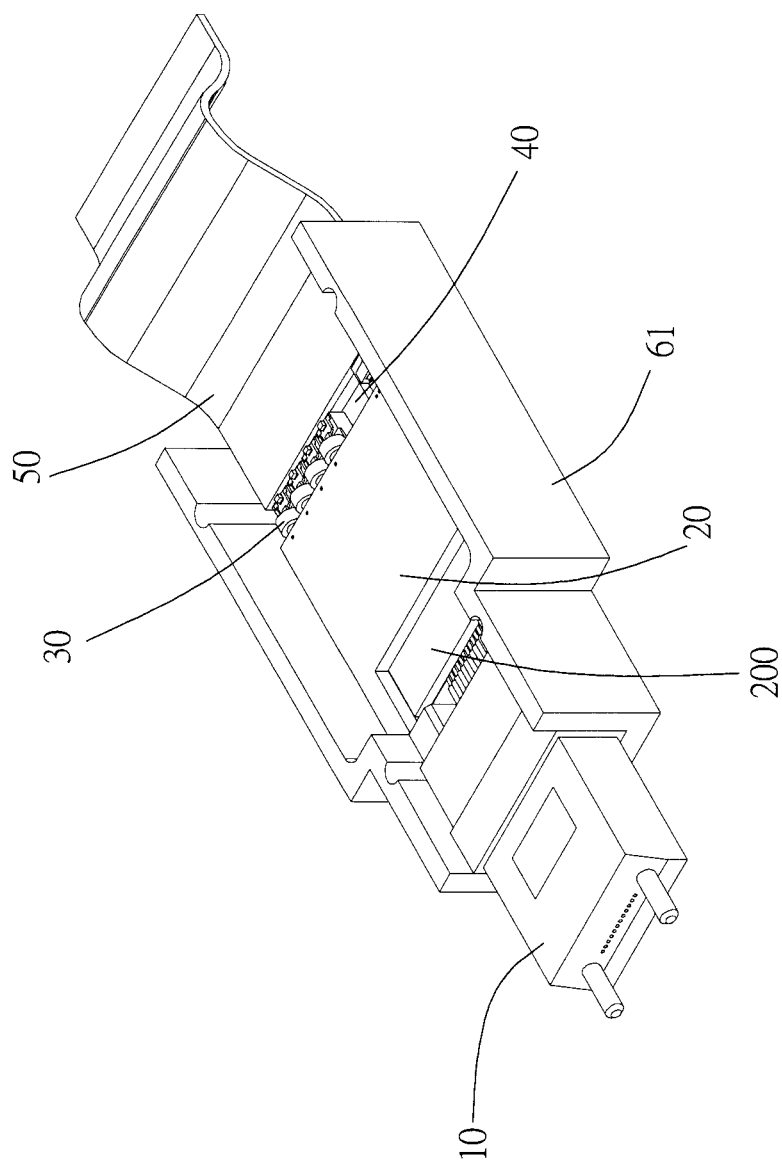
FIG. 2A is a view of FIG. 1 with the cover plate removed.
Figure 2B:
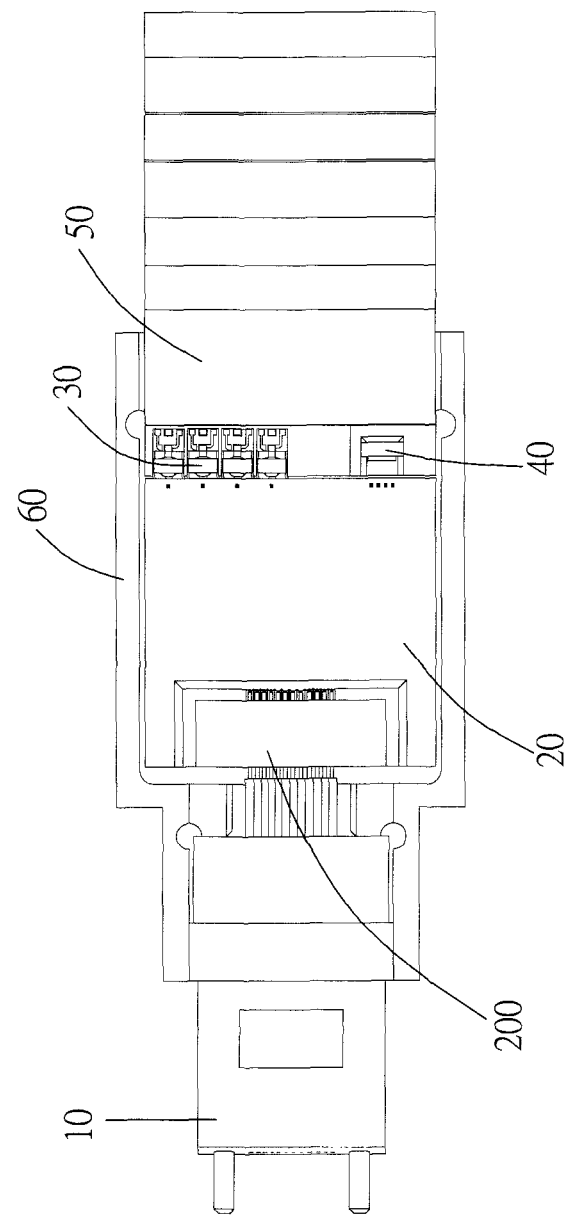
FIG. 2B is a top view of FIG. 2A.

Refer now to FIG. 1, FIG. 2A and FIG. 2B; where FIG. 1 is a schematic perspective view of a preferred embodiment of the high-speed multi-channel optical transmitter module in accordance with the present invention, FIG. 2A is a view of FIG. 1 with the cover plate removed, and FIG. 2B is a top view of FIG. 2A.

As shown in FIG. 1, FIG. 2A and FIG. 2B, in this preferred embodiment of the present invention, the high-speed multi-channel optical transmitter module 1 includes: a casing 60, an MT ferrule 10, a waveguide sub-module 20, at least one laser-diode (LD) sub-module 30, at least one photo-diode (PD) sub-module 40, and a circuit board 50.

Figure 8B:
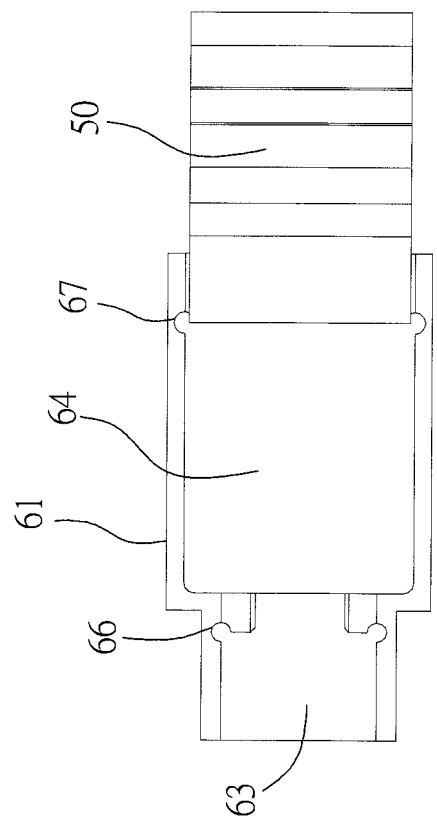
FIG. 8B is a top view of FIG. 8A, excluding the cover plate.
Figure 8A:
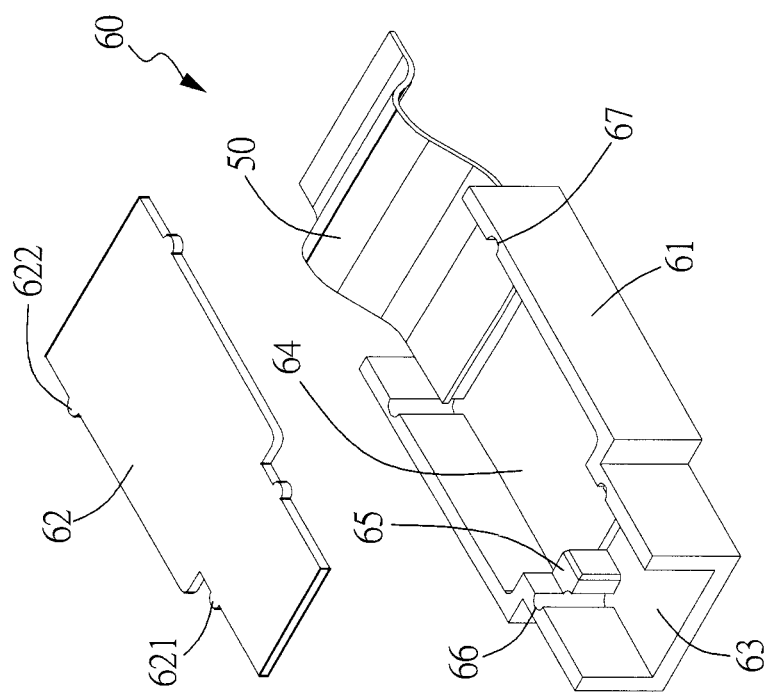
FIG. 8A is a schematic perspective view of the housing frame of FIG. 1, with the cover plate aside.

Refer now to FIG. 8A and FIG. 8B; where FIG. 8A is a schematic perspective view of the housing frame of FIG. 1 with the cover plate aside, and FIG. 8B is a top view of FIG. 8A excluding the cover plate. In this embodiment, the casing 60 includes a housing frame 61, a cover plate 62, and an accommodation space inside the casing. While the cover plate 62 is moved to seal the housing frame 61, the accommodation space is formed between the housing frame 61 and the cover plate 62, with a front opening and a rear opening of the casing 60 left for the interior accommodation space to communicate in space with the atmosphere outside the casing 60. In this embodiment, the circuit board 50 is preferable to be a flexible printed circuit board located in the accommodation space by closing to a rear end of the waveguide sub-module 20, as shown in FIG. 1. The circuit board 50 is electrically coupled with the at least one LD sub-module 30 and the at least one PD sub-module 40, and a tail portion of the circuit board 50 is exposed out of the casing 60 so as to provide connections with foreign external circuits (not shown in the figure). In this embodiment, the housing frame 61 has a front accommodation area 63 for accommodating the MT ferrule 10, a middle accommodation area 64 for accommodating the waveguide sub-module 20, at least one protrusive step structure 65 located between the front accommodation area 63 and the middle accommodation area 64, and a rear accommodation area (not labeled in the figure) for accommodating the circuit board 50. In addition, a plurality of nodes 621, 622 and a plurality of corresponding notch grooves 66, 67 are provided to the casing 60 for ensuring the engagement between the cover plate 62 and the housing frame 61. After all the sub-modules and necessary components are assembled to form the high-speed multi-channel optical transmitter module 1 of the present invention, the engagement of the cover plate 62 and the housing frame 62, whether being airtight or not, would allow the circuit board 50 to be protrusive out of the rear opening of the casing 60, such that signal connection between the module 1 and the other device can he established. Thereupon, safety of the high-speed multi-channel optical transmitter module 1 can be assured, and future assembling with other optical transceiver apparatus can be much easier.

As shown in FIG. 1 and FIG. 2A, the MT ferrule 10 is located in the accommodation space of the casing 60, and a front end surface of the MT ferrule 10 is exposed out of the front end of the casing 60, so that the front opening of the casing 60 is blocked. Refer now to FIG. 3A, FIG. 3B, FIG. 3C and FIG. 3D; where a perspective view, a top view, a lateral side view and a front view of the MT ferrule of FIG. 1 are schematically shown, respectively. In this embodiment, the MT ferrule 10 has a connector body 11, a plurality of optical interfaces 12 furnished to a front end surface of the connector body 11 to provide connections with a foreign optical fiber socket (not shown in the figure), two location pillars 16, a window 17 on the connector body 11, a flange 13 for buckling engagement, and a protrusive portion 14 located at a rear portion of the connector body 11. In addition, an optical fiber array formed by a plurality of bare optical fibers 15 is protruded from a tail end surface of the protrusive portion 14 of the MT ferrule 10. At an end of each of the bare optical fibers 15, a lens structure (not shown in the figure) is further included to enhance the optical coupling efficiency. Preferably, a progressive length of the bare optical fiber 15 can be, but not limited to, about 5 mm. In this embodiment, the front end surface as well as both the optical interface 12 and location pillar 16 of the MT ferrule 10 shall meet relevant specifications or standards in the art of the MT ferrule 10. For example, an 8-degree slope shall provided tongue front end surface of the MT ferrule 10, such that the high-speed multi-channel optical transmitter module 1 of the present invention can has its own MT ferrule 10 to engage with other foreign optical fiber sockets fulfilling the same specifications or standards.

Figure 4B:
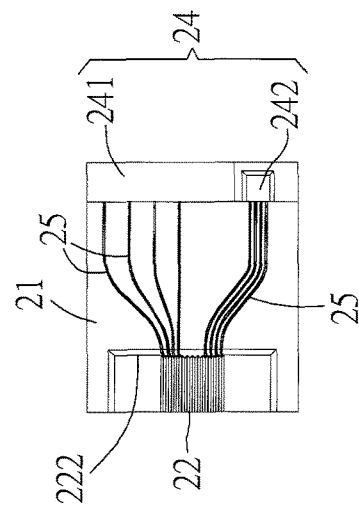
FIG. 4B is a top view of FIG. 4A.
Figure 5:
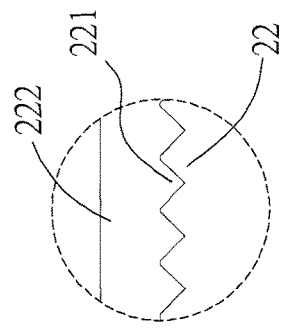
FIG. 5 is an enlarged view of circle A of FIG. 4C.
Figure 4A:
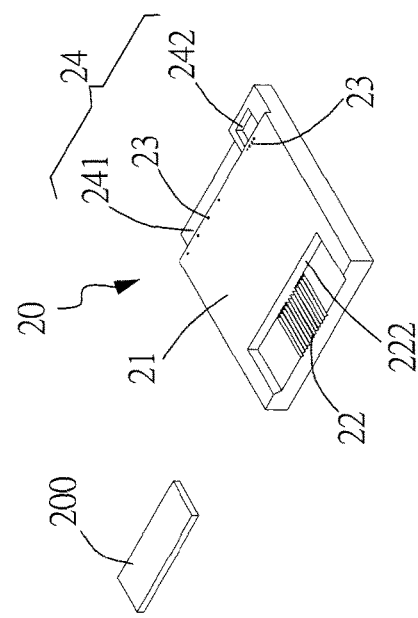
FIG. 4A is a schematic perspective view of waveguide sub-module of FIG. 1, with the constraint plate aside.
Figure 4C:
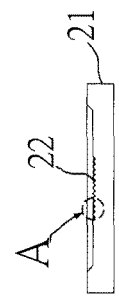
FIG. 4C is a front view of FIG. 4A.
Figure 6A:
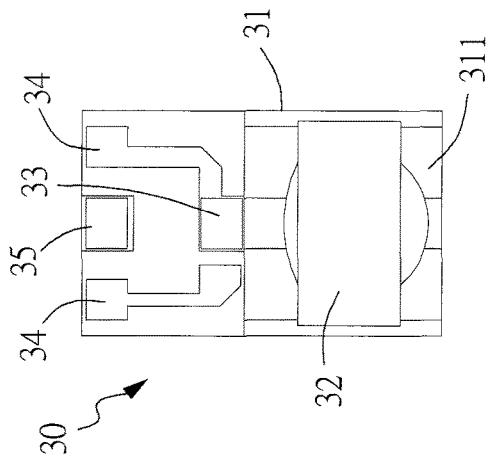
FIG. 6A is a schematic perspective view of the LD sub-module of FIG. 1.
Figure 6B:
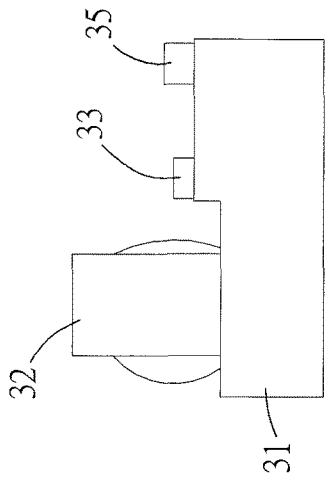
FIG. 6B is a top view of FIG. 6A.
Figure 6C:
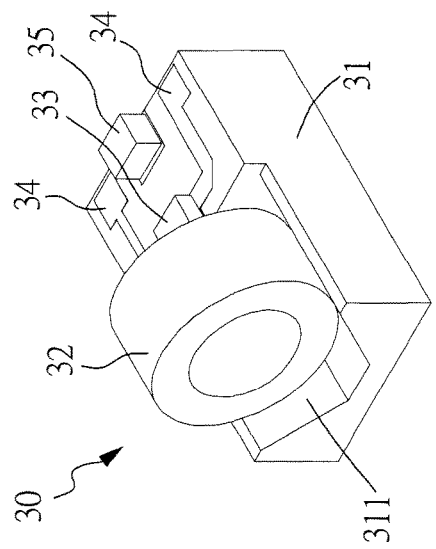
FIG. 6C is a front view of FIG. 6A.
Figure 6D:
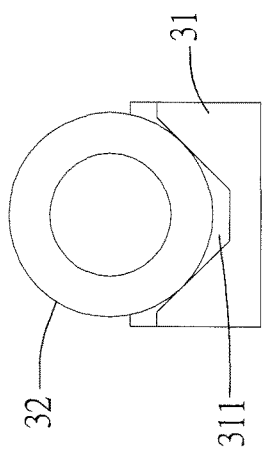
FIG. 6D is a lateral side view of FIG. 6A.

In this embodiment, the waveguide sub-module 20 is located in the accommodation space by closing to the MT ferrule 10. Refer now to FIG. 4A, FIG. 4B and FIG. 3C; where a perspective view, a top view and a front view of the waveguide sub-module of FIG. 1 are schematically shown, respectively. In this embodiment, the waveguide sub-module 20 includes a waveguide body 21, a recessed portion 22 located at a front portion of the waveguide body 21, a photo-transceiving component accommodation area 24 located at a rear portion of the waveguide body 21, and a plurality of waveguide structures 25 extended between the recessed portion 22 and the photo-transceiving component accommodation area 24 inside the waveguide body 21. In addition, the recessed portion 22 further includes a plurality of V-shape grooves 221 extending in a longitudinal (front-end) direction of the waveguide body 21. In this embodiment, the photo-transceiving component accommodation area 24 can be further divided into an LD component accommodation area 241 and a PD component accommodation area 242. Further, a plurality of markers 23 are located on an upper surface of the waveguide body 21 by closing to the LD component accommodation area 241 and the PD component accommodation area 242. In particular, a number of these markers 23 is equal to the total number of the LD components 33 and the PD components 42, such that each market 23 can be used to tell and thus align easier the corresponding position of the LD sub-module 30 or the PD sub-module 40. In this embodiment, the plurality of waveguide structures 25 are not equally spaced. In practice, the spacing for the waveguide structures 25 close to a receiving (Rx) side of the MT ferrule 10 would be narrower (for example, but not limited to, 0.25 mm), while the spacing for the waveguide structures 25 close to a transmitting (Tx) side of the MT ferrule 10 would be wider (for example, but, not limited to, 0.7 mm~2 mm). As shown in FIG. 5, an enlarged view of area A of FIG. 4C is provided to demonstrate clearly profiles of the V-shape grooves 221 of the recessed portion 22 at the front portion of the waveguide body 21. In this embodiment, each of the bare optical fibers 15 extended from the tail end surface of the MT ferrule 10 is positioned by the corresponding V-shape groove 221, such that one end of the bare optical fiber 15 can contact at a contact surface 222 on the recessed portion 22 of the waveguide sub-module 20 so as further to optically couple a corresponding waveguide structure 25. In the present invention, the arrangement of the plurality of V-shape grooves 221, including the density, the spacing and the depth, is determined according to the specifications of the bare optical fibers 15. Thereupon, while in assembling, the plurality of bare optical fibers 15 can be guided by the corresponding V-shape grooves 221 so as to be passively positioned at respective predetermined positions on the contact surface 222 at the recessed portion 22 of the waveguide sub-module 20. Thus, assembling of the waveguide sub-module 20 can be less laborious, and the position precision as well as the packaging yield can be raised. In addition, the constraint plate 200 on the recessed portion 22 office the waveguide sub-module 20 is preferably made of a transparent material, such as a transparent crystal glass or a transparent plastics. Thereupon, the plurality of the bare optical fibers 15 can be observed through the constraint plate 200. While in assembling, the constraint plate 200 and an ultraviolet (UV) glue can be used to suppress fixedly the plurality of the bare optical fibers 15 into the corresponding V-shape grooves 221.

The at least one LD sub-module 30, located in the LD component accommodation area 241 of the photo-transceiving component accommodation area 24 at the rear portion of the waveguide sub-module 20, is coupled optically the corresponding at least one the waveguide structure 25. Refer now to FIG. 6A, FIG. 6B, FIG. 6C and FIG. 6D; where a perspective view, a top view, a front view and a lateral side view of the LD sub-module of FIG. 1 are schematically shown, respectively. In this embodiment, a plurality of the LD sub-modules 30 is included (not limited to four shown in the figure), and each of the LD sub-modules 30 includes an LD base block 31, a V-shape carrier recess 311 located at a front portion of the base block 31, a lens 32 located on the V-shape carrier recess 311, an LD component 33 located on the LD base block 31 and at a position corresponding to an optical axis of the lens 32, a monitor photo-diode (MPD) 35 located at a rear portion of the LD base block 31, and a plurality of electrodes 34 electrically coupled with the LD component 33 and extending to the rear portion of the LD base block 31. In this embodiment, the optical axis of each of the lenses 32 is located by corresponding to the at least one waveguide structure 25 of the waveguide sub-module 20. Also, either the LD component 33 or the monitor photo-diode 35 is a semiconductor chip produced by a corresponding semiconductor manufacturing process, preferably a laser-diode chip on sub-mount (LD COS) directly mounted on a corresponding surface of the LD base block 31. While in assembling, each of the LD sub-modules 30 is firstly assembled into the LD component accommodation area 241 of the waveguide sub-module 20, and then the plurality of electrodes 34 and the monitor photo-diode 35 are wire-bonded to electrically couple the circuit board 50.

Figure 7B:
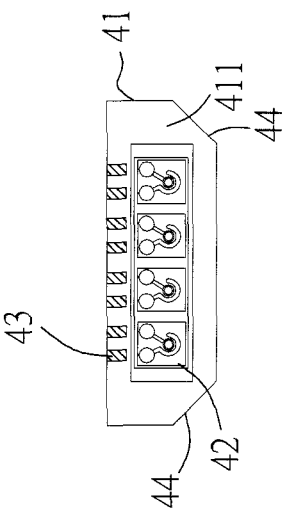
FIG. 7B is a front view of FIG. 7A.
Figure 7C:
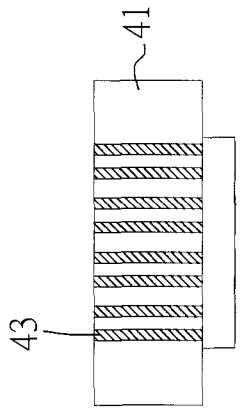
FIG. 7C is a top view of FIG. 7A.
Figure 7A:
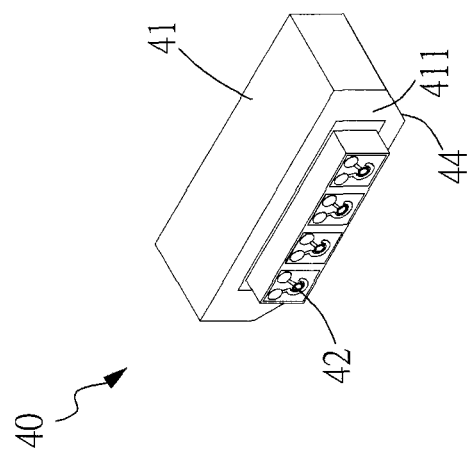
FIG. 7A is a schematic perspective view of the PD sub-module of FIG. 1.

The at least one PD sub-module 40, located in the PD component accommodation area 242 of the photo-transceiving component accommodation area 24 at the rear portion of the waveguide sub-module 20, is optically coupled with the corresponding at least one waveguide structure 25. Refer now to FIG. 7A, FIG. 7B and FIG. 7C; where a perspective view, a front view and a top view of the PD sub-module of FIG. 1 are schematically shown, respectively. In this embodiment, one PD sub-module 40 is included. The PD sub-module 40 includes a PD base block 41, and a plurality of PD components 42 (four for example) located on a front end surface 411 of the PD base block 41. Each of the PD components 42 is corresponding to one waveguide structure 24 of the waveguide sub-module 20. Two chambers 44 are included on a lower lateral surface of the PD base block 41 so as helpful to be mounted into the housing frame 61. In this embodiment, at positions of the PD base block 41 respective to individual PD components 42, a plurality of metal strips 43 are located by extending over an upper surface and the front end surface 411 of the PD base block 41. A number of the metal strips 43 is not less than twice the number of the PD components. The PD component 42 is a semiconductor chip produced by a corresponding semiconductor manufacturing process, preferably a laser-diode chip on sub-mount (LD COS) directly mounted on a surface of the PD base block 41. While in assembling, each of the metal strips 43 on the front end surface 411 of the PD base block 41 as shown in FIG. 7B is firstly wire-bonded individually to the two electrodes of the corresponding PD component 42. Then, each of the metal strips 43 on the upper surface of the PD base block 41 A's shown in FIG. 7C is individually wire-bonded to the circuit board 50. Thereupon, the PD sub-module 40 can be electrically coupled with the circuit board 50.

Figure 9:
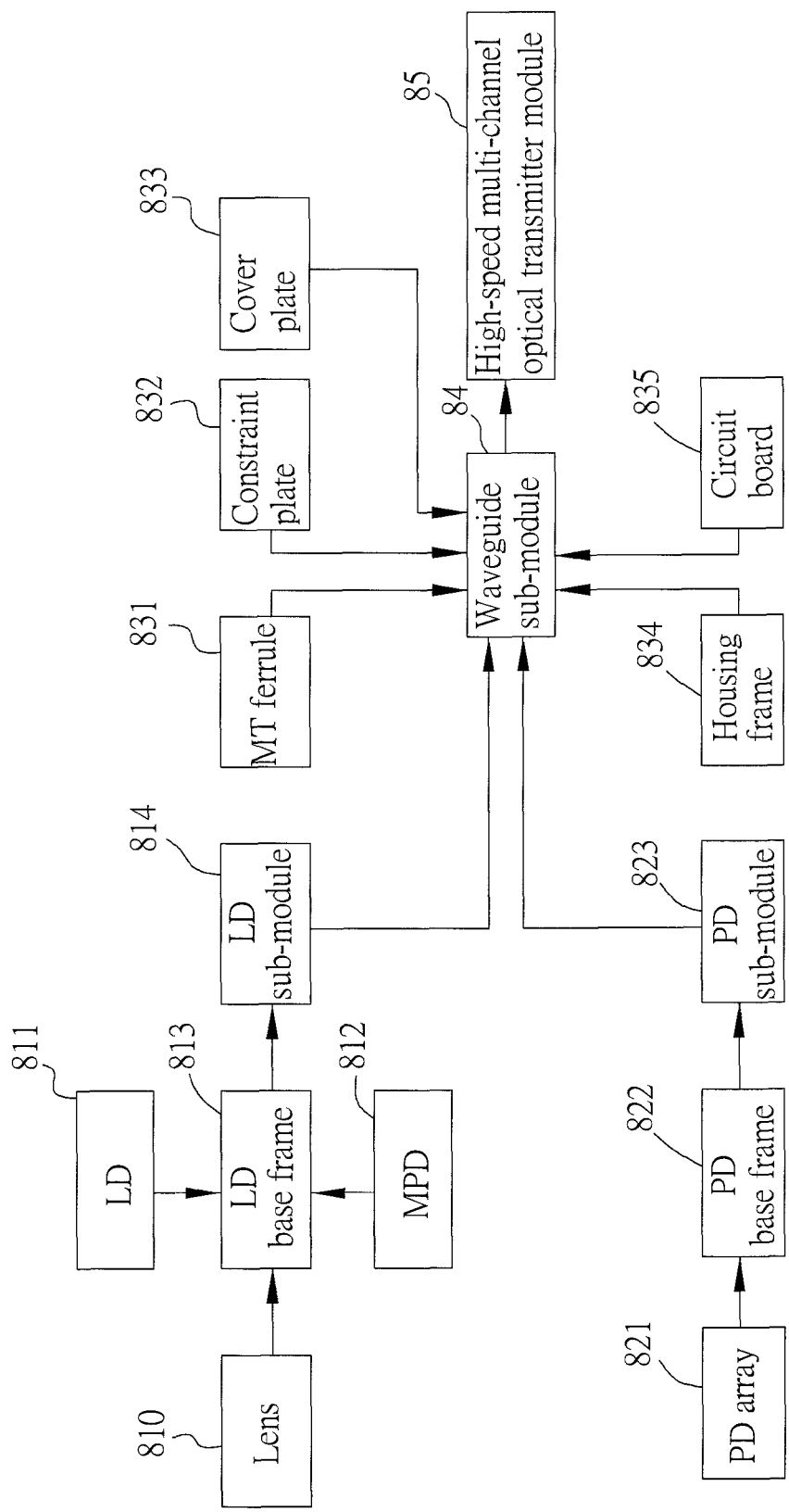
FIG. 9 is a schematic block view showing a preferred embodiment of the method for fabricating the high-speed multi-channel optical transmitter module in accordance with the present invention.

Referring now to FIG. 9, a schematic block view showing a preferred embodiment of the method for fabricating the high-speed multi-channel optical transmitter module in accordance with the present invention is schematically shown. The method for fabricating the high-speed multi-channel optical transmitter module includes the following steps.

Step (A): Provide at least one LD sub-module 814, at least one PD sub-module 823, a waveguide sub-module 84, an MT ferrule 831, a constraint plate 832, a cover plate 833, a housing frame 834 and a circuit board 835. Each said LD sub-module 814 is formed by mounting a lens 810, an LD component 811 and a monitor photo-diode (MPD) 812 on an LD base block 813. Each said PD sub-module 823 is formed by mounting a plurality of PD components 821 in an array manner on a PD base block 822. A rear end surface of the MT ferrule 831 has an optical fiber array consisted of a plurality of bare optical fibers. The waveguide sub-module 84 includes a recessed portion located at a front portion thereof, a photo-transceiving component accommodation area located at a rear portion thereof, and a plurality of waveguide structures located inside the waveguide sub-module 84 and extending between the recessed portion and the photo-transceiving component accommodation area. On the the recessed portion, a plurality of V-shape grooves are included and extending individually in a longitudinal (front-rear) direction.

Step (B): Mount the at least one LD sub-module 814 and the at least one PD sub-module 823 into the photo-transceiving component accommodation area of the waveguide sub-module 84. In addition, mount each of the bare optical fibers of the MT ferrule 831 into the recessed portion of the waveguide sub-module 84, and also have each of the bare optical fibers to be positioned into the corresponding V-shape grooves, such that each end of the bare optical fiber would contact a contact surface on the recessed portion of the waveguide sub-module 84 so as to optically couple one respective waveguide structure. Further, the constraint plate 832 is applied to suppress adhesively the plurality of bare optical fibers in the recessed portion. Then, assemble the waveguide sub-module 84 onto the housing frame 834, and wire-bond the circuit board 835 to the plurality of LD components 811 and the plurality of PD components 821 so as to establish electric connections in between. Finally, move the cover plate 833 to seal the the housing frame 834, such that the packaging of the high-speed multi-channel optical transmitter module 85 is completed.

As described above, the high-speed multi-channel optical transmitter module of the present invention packages a plurality of LD components into an LD sub-module and a plurality of PD components into a single PD sub-module, and then these LD sub-module and PD sub-module are assembled to the waveguide sub-module made of a waveguide material and built in with internal waveguide structures. Also, the waveguide sub-module further includes the recessed portion and the V-shape grooves for guiding and positioning the bare optical fibers. Then, the waveguide sub-module integrated with the LD sub-module and the PD sub-module is used to connect and mount the MT ferrule and the circuit board into the housing frame. Thereupon, the high-speed multi-channel optical transmitter module of the present invention can be simply structured, contain fewer components (due to the formation pattern of sub-modules), and be convenient for packaging. Further, the inclusion of the markers and the V-shape grooves into the high-speed multi-channel optical transmitter module would make the packaging process more time and labor saving. In addition, the waveguide structures inside the waveguide sub-module is introduced to substitute the conventional design of having the optical fibers directly to bridge the LD/PD components and the MT ferrule, so that the production damage can be lowered, and the detect-free rate of products can be increased.

While the present invention has been particularly shown and described with reference to a preferred embodiment, it will be understood by those skilled in the art that various changes in form and detail may be without departing from the spirit and scope of the present invention.

What is claimed is:

1. A high-speed multi-channel optical transmitter module, comprising:
   a casing, having thereinside an accommodation space;
   an MT ferrule, located in the accommodation space, having thereof a front end surface exposed out of the casing and a rear end surface having an optical fiber array including a plurality of bare optical fibers;
   a waveguide sub-module, located in the accommodation space by closing to the MT ferrule, further including a front portion, a plurality of waveguide structures and a rear portion, the front portion having a recessed portion, the rear portion having a photo-transceiving component accommodation area, and the plurality of waveguide structures located inside the waveguide sub-module and extending between the recessed portion and the photo-transceiving component accommodation area, the recessed portion having a plurality of V-shape grooves extending in a front-rear direction, each of the bare optical fibers being positioned by one said corresponding V-shape groove, such that an end of said each of the bare optical fibers is to contact a contact surface on the recessed portion of the waveguide sub-module and to optically couple one said corresponding waveguide structure;
   at least one LD sub-module, located in the photo-transceiving component accommodation area, optically coupled with at least one said corresponding waveguide structure;
   at least one PD sub-module, located in the photo-transceiving component accommodation area, optically coupled with at least one said corresponding waveguide structure; and
   a circuit board, located in the accommodation space by closing to the rear portion of the waveguide sub-module, electrically coupled with the at least one LD sub-module and the at least one PD sub-module, further having a tail portion thereof exposed out of the casing.

2. The high-speed multi-channel optical transmitter module of claim 1, wherein the casing includes a housing frame and a cover plate, the accommodation space being formed between the housing frame and the cover plate, the housing frame having thereon a front accommodation area for accommodating the MT ferrule, a middle accommodation area for accommodating the waveguide sub-module, at least one protrusive step structure located between the front accommodation area and the middle accommodation area, and a rear accommodation area for accommodating the circuit board, a plurality of nodes and a plurality of notch grooves being included for buckling the cover plate and the housing frame.

3. The high-speed multi-channel optical transmitter module of claim 1, further including a constraint plate located above the recessed portion of the waveguide sub-module, the circuit board being a flexible circuit board.

4. The high-speed multi-channel optical transmitter module of claim 1, including a plurality of said LD sub-modules, each of said LD sub-modules including an LD base block, a V-shape carrier recess located at a front portion of the base block, a lens located on the V-shape carrier recess, an LD component located on the LD base block at a position corresponding to an optical axis of the lens, a monitor photo-diode located at a rear portion of the LD base block, and a plurality of electrodes electrically coupling the LD component and extending to the rear portion of the LD base block; wherein the optical axis of the lens is corresponding to at least one said waveguide structure of the waveguide sub-module.

5. The high-speed multi-channel optical transmitter module of claim 1, including only one said PD sub-module, the PD sub-module including a PD base block, a plurality of PD components located on a front end surface of the PD base block, each said PD component being corresponding to at least one said waveguide structure of the waveguide sub-module; wherein a plurality of metal strips are located on the PD base block at positions corresponding to the respective PD components, and the plurality of metal strips are extended on the front end surface and an upper surface of the PD base block.

6. A method for fabricating a high-speed multi-channel optical transmitter module, comprising the steps of:
   providing at least one LD sub-module, at least one PD sub-module, a waveguide sub-module, an MT ferrule, a constraint plate, a cover plate, a housing frame and a circuit board; each said LD sub-module being formed by mounting a lens, an LD component and a monitor photo-diode on an LD base block; the PD sub-module being formed by mounting at least one PD component on a PD base block; the MT ferrule having a rear end surface further including an optical fiber array formed by a plurality of bare optical fibers; the waveguide sub-module further including a front portion, a plurality of waveguide structures and a rear portion, the front portion having a recessed portion, the rear portion having a photo-transceiving component accommodation area, and the plurality of waveguide structures located inside the waveguide sub-module and extending between the recessed portion and the photo-transceiving component accommodation area, the recessed portion having a plurality of V-shape grooves extending in a front-rear direction; and
   mounting the at least one LD sub-module and the at least one PD sub-module into the photo-transceiving component accommodation area of the waveguide sub-module, mounting each of the bare optical fibers of the MT ferrule into the recessed portion of the waveguide sub-module, and also having each of the bare optical fibers to be positioned into the corresponding V-shape grooves, such that each end of the bare optical fiber would contact a contact surface on the recessed portion of the waveguide sub-module so as to optically couple one respective waveguide structure; further, the constraint plate being applied to suppress adhesively the plurality of bare optical fibers in the recessed portion; then, assembling the waveguide sub-module onto the housing frame, and wire-bonding the circuit board to the plurality of LD components and the plurality of PD components so as to establish electric connections in between; finally, moving the cover plate to seal the housing frame, such that the packaging of the high-speed multi-channel optical transmitter module is completed.

7. The method for fabricating a high-speed multi-channel optical transmitter module of claim 6, wherein a casing includes a housing frame and a cover plate, the accommodation space being formed between the housing frame and the cover plate, the housing frame having thereon a front accommodation area for accommodating the MT ferrule, a middle accommodation area for accommodating the waveguide sub-module, at least one protrusive step structure located between the front accommodation area and the middle accommodation area, and a rear accommodation area for accommodating the circuit board, a plurality of nodes and a plurality of notch grooves being included for buckling the cover plate and the housing frame.

8. The method for fabricating a high-speed multi-channel optical transmitter module of claim 6, further including the constraint plate located above the recessed portion of the waveguide sub-module, the circuit board being a flexible circuit board.

9. The method for fabricating a high-speed multi-channel optical transmitter module of claim 6, including a plurality of said LD sub-modules, each of said LD sub-modules including an LD base block, a V-shape carrier recess located at a front portion of the base block, a lens located on the V-shape carrier recess, an LD component located on the LD base block at a position corresponding to an optical axis of the lens, a monitor photo-diode located at a rear portion of the LD base block, and a plurality of electrodes electrically coupling the LD component and extending to the rear portion of the LD base block; wherein the optical axis of the lens is corresponding to at least one said waveguide structure of the waveguide sub-module.

10. The method for fabricating a high-speed multi-channel optical transmitter module of claim 6, including only one said PD sub-module, the PD sub-module including a PD base block, a plurality of PD components located on a front end surface of the PD base block, each said PD component being corresponding to at least one said waveguide structure of the waveguide sub-module; wherein a plurality of metal strips are located on the PD base block at positions corresponding to the respective PD components, and the plurality of metal strips are extended on the front end surface and an upper surface of the PD base block.

* * * * *